(12) United States Patent
Teo et al.

(10) Patent No.: US 7,868,492 B2
(45) Date of Patent: Jan. 11, 2011

(54) NANO-POSITIONING ELECTROMAGNETIC LINEAR ACTUATOR

(75) Inventors: Tat Joo Teo, Singapore (SG); Guilin Yang, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 344 days.

(21) Appl. No.: 12/084,948

(22) PCT Filed: Oct. 23, 2006

(86) PCT No.: PCT/SG2006/000311

§ 371 (c)(1),
(2), (4) Date: May 14, 2008

(87) PCT Pub. No.: WO2007/055656

PCT Pub. Date: May 18, 2007

(65) Prior Publication Data

US 2010/0060088 A1      Mar. 11, 2010

(30) Foreign Application Priority Data

Nov. 14, 2005   (SG) .............................. 200508479-3

(51) Int. Cl.
*H02K 33/00* (2006.01)
(52) U.S. Cl. .............................. 310/29; 310/14; 310/32

(58) Field of Classification Search .............. 310/12.31, 310/13–15, 28–36
See application file for complete search history.

(56) References Cited

U.S. PATENT DOCUMENTS

| | | | | |
|---|---|---|---|---|
| 3,731,548 | A * | 5/1973 | Bocksruker | 74/96 |
| 4,169,234 | A * | 9/1979 | Yonkers | 310/29 |
| 4,945,269 | A * | 7/1990 | Kamm | 310/15 |
| 5,255,521 | A * | 10/1993 | Watanabe | 62/6 |
| 5,969,892 | A * | 10/1999 | Slusher | 359/872 |
| 6,188,149 | B1 | 2/2001 | De Jager et al. | |
| 6,781,259 | B2 * | 8/2004 | Hente | 310/12.26 |
| 7,117,724 | B1 | 10/2006 | Goodberlet et al. | |
| 7,661,621 | B2 * | 2/2010 | Comotto | 242/419.3 |
| 2003/0218403 | A1 | 11/2003 | Dubowsky et al. | |
| 2004/0174237 | A1 | 9/2004 | Matsumoto | |

FOREIGN PATENT DOCUMENTS

| | | |
|---|---|---|
| EP | 1637277 | 3/2006 |
| TW | 222267 | 10/2004 |
| WO | WO 2003/055046 | 7/2003 |

* cited by examiner

*Primary Examiner*—Thanh Lam
(74) *Attorney, Agent, or Firm*—Jacobson Holman PLLC (57) ABSTRACT

A flexure for an electromagnetic nano-positioning linear actuator having a support and an actuating body, the flexure comprising: a first resilient end for attaching to the support; a second resilient end for attaching to the actuating body; and a substantially rigid intermediate portion located between the first resilient end and the second resilient end.

19 Claims, 7 Drawing Sheets

NANO-POSITIONING ELECTROMAGNETIC LINEAR ACTUATOR

This is a national stage of PCT/SG06/000311 filed Oct. 23, 2006 and published in English.

FIELD OF THE INVENTION

The invention relates to electromagnetic linear actuators, particularly to nano-positioning actuators.

BACKGROUND OF THE INVENTION

High precision nano-positioning systems typically use linear actuators to effect positioning at the nano-scale range. Positioning speed and accuracy are determined largely by the type of linear actuators used. It is desirable that such systems have high positioning speed and accuracy as they directly affect the speed and accuracy of nano-manufacturing processes in which they are commonly used.

Various types of nano-positioning linear actuators are currently available, with the most popular one being solid-state piezoelectric (PZT) actuators as they are able to provide a large output force with high stiffness. However, PZT actuators have a limited motion range in the hundreds of microns, which makes them unsuitable for applications where a few millimeters of motion are required. On the other hand, conventional electromagnetic actuators that can provide millimeter motion range have small output force and low stiffness. These typically use conventional roller or ball bearings that introduce backlash and Coulomb friction which affects positioning repeatability, and hence accuracy. Use of notch-type flexure joints instead of mechanical bearings can help to achieve frictionless, wear-free and repeatable motion at high resolution. However, such flexures have a small motion range and possess relatively high stiffness in the driving direction which reduces the maximum output force that can be achieved.

Thus, there is presently no nano-positioning linear actuator available that can offer accurate millimeter displacement with moving speed greater than 100 mm/s and relatively high output force greater than 50N, in order for nano-manufacturing processes to be automated.

SUMMARY

According to one aspect, there is provided a flexure for an electromagnetic nano-positioning linear actuator having a support and an actuating body. The flexure comprises a first resilient end for attaching to the support; a second resilient end for attaching to the actuating body; and a substantially rigid intermediate portion located between the first resilient end and the second resilient end.

According to another aspect, there is provided an electromagnetic nano-positioning linear actuator comprising a support; an actuating body moveable with respect to the support; an electromagnetic assembly connected to the actuating body and the support for moving the actuating body when a current is applied to the electromagnetic assembly; and at least one flexure comprising a first resilient end for attaching to the support; a second resilient end for attaching to the actuating body; and a substantially rigid intermediate portion located between the first resilient end and the second resilient end.

BRIEF DESCRIPTION OF THE DRAWINGS

In order that the present invention may be fully understood and readily put into practical effect, there shall now be described by way of non-limitative example only preferred embodiments of the present invention, the description being with reference to the accompanying illustrative drawings.

In the drawings.

DETAILED DESCRIPTION

Figure 1:
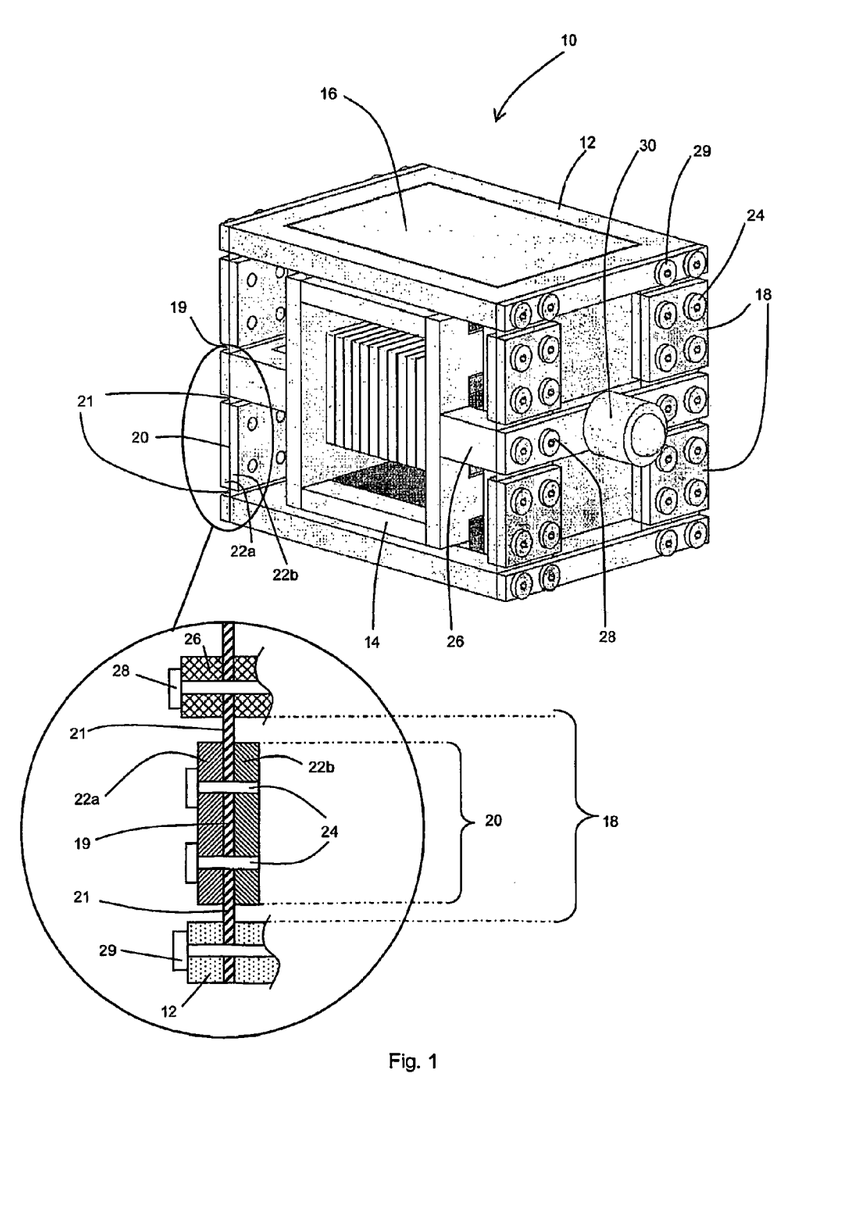
FIG. 1 is a perspective view of a nano-positioning electromagnetic linear actuator and a side view of a flexure in accordance with one embodiment of the invention.

According to one aspect, there is provided a flexure 18 for a nano-positioning electromagnetic linear actuator 10 as shown in FIG. 1. The actuator 10 comprises a support 12 coupled to an actuating body 14 via a number of the flexures 18 each having a leaf spring configuration. The actuating body 14 is moveable with respect to the support 12 as a result of each flexure 18 being able to bend. Each flexure 18 comprises a substantially rigid intermediate portion 20 where bending is minimized or prevented altogether, and resilient ends 21a, 21b where bending can take place. Intermediate portion 20 is located between the actuating body 14 and the support 12.

In one embodiment, each flexure comprises a resilient strip 19 and two plates 22a, 22b. The intermediate portion 20 is made by clamping a portion of the resilient strip 19 between the two plates 22a, 22b by means of fasteners that pass through the resilient strip 19 and the two plates 22a, 22b, such as screws 24. Alternatively, rivets may also be used. For effective operation, the resilient strip 19 should have a width that is significantly greater than its thickness. For example, the width of the resilient strip 19 is more than 100 times greater than its thickness.

In this embodiment, one resilient strip 19 is used to form two flexures 18. The actuating body 14 has arms 26 which are secured to the middle of each resilient strip 19 by means of screws 28. This separates each resilient strip 19 into two segments. Each segment forms one flexure 18 having a substantially rigid intermediate portion 20 and two bendable resilient ends 21a, 21b. The flexures 18 are thus attached to the support 12 at first resilient end 21a and attached to the actuating body 14 at second resilient end 21b. First resilient end 21a is attached to the support 12 by means of screws 29. In this way, the actuating body 14 is coupled to the support 12 via the flexures 18.

An output shaft 30 can be secured to the actuating body 14. The linear actuator 10 is designed to have a laterally symmetrical configuration in order to minimize imbalances so as to achieve high positioning resolution. Movement of the actuating body 14 is effected by means of an electromagnetic assembly 16 connected to both the actuating body 14 and the support 12.

Figure 2:
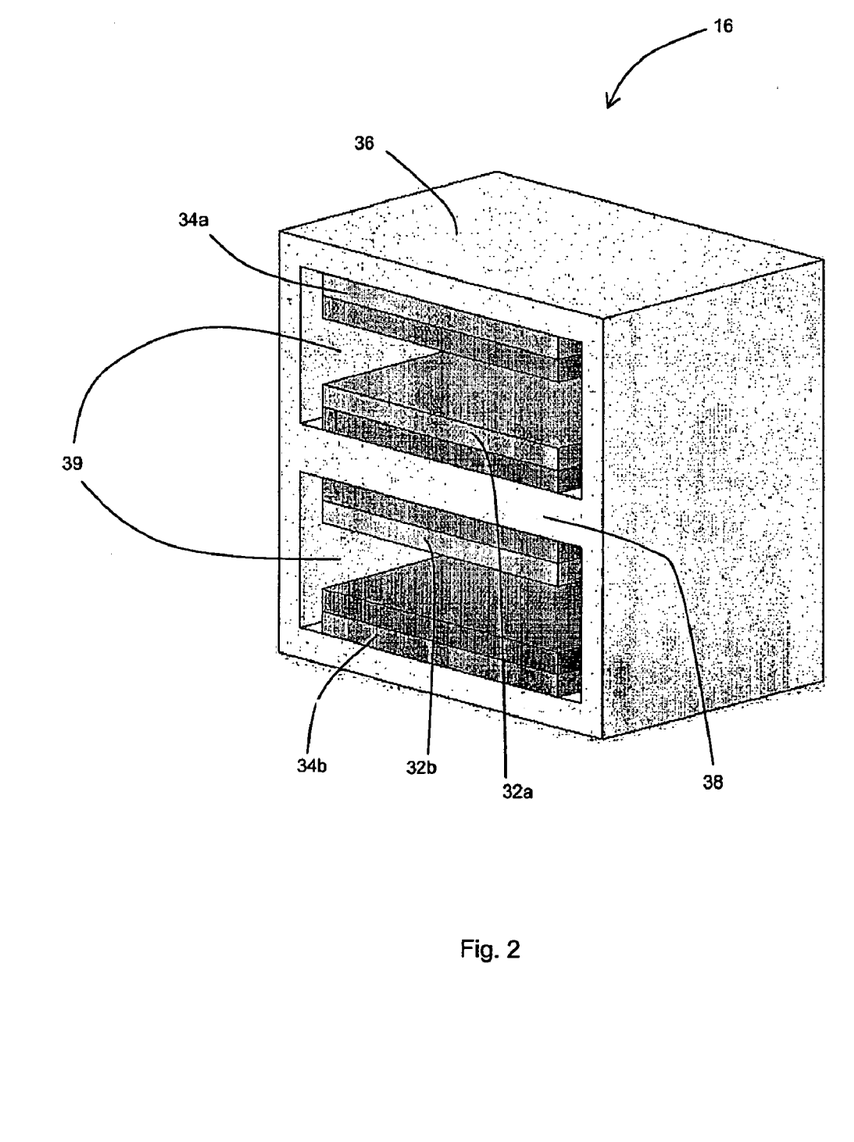
FIG. 2 is a perspective view of an electromagnetic assembly in the actuator shown in FIG. 1.

The electromagnetic assembly 16 is depicted in FIG. 2. It comprises a rectangular frame 36, two core magnets 32a, 32b and two shell magnets 34a, 34b. The frame 36 is made of a ferromagnetic material such as Fe. The magnets 32a, 32b, 34a, 34b are preferably NdFeB rare-earth permanent magnets having a remanence magnetic flux of at least 1.0 Tesla. A divider 38 bisects the frame 36. The core magnets 32a, 32b are mounted in an attracting position with respect to each other on either side of the divider 38. The shell magnets 34a, 34b are mounted within the rectangular frame 36. One shell magnet 34a is mounted on an inner side of the frame 36 in an attracting position with respect to the core magnet 32a. The other shell magnet 34b is mounted on an opposite inner side of the frame 36 in an attracting position with respect to the core magnet 32b. Air gaps 39 are thus defined between the shell magnet 34a and the core magnet 32a, and between the core magnet 32b and the shell magnet 34b.

Figure 3:
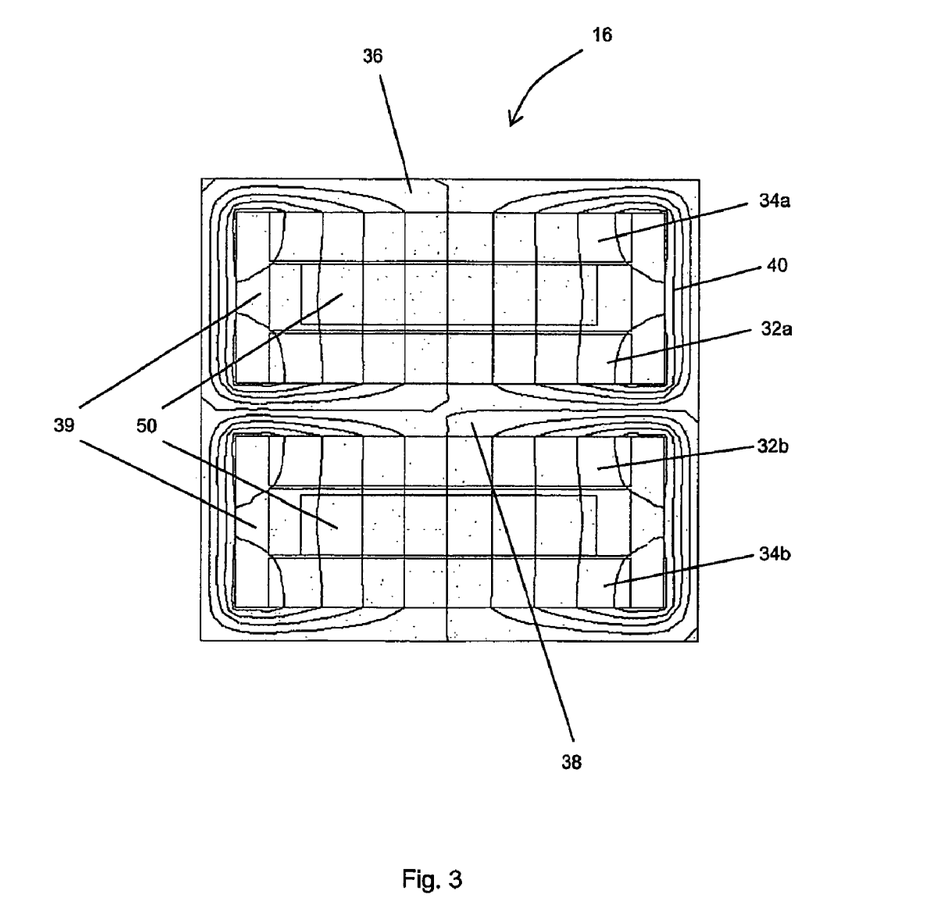
FIG. 3 is a schematic side view of magnetic flux of the electromagnetic assembly shown in FIG. 2.

The arrangement of the magnets 32a, 32b, 34a, 34b on the frame 36 results in a dual-magnet configuration having a magnetic flux 40 as shown in FIG. 3. The magnetic flux 40 has a common magnetic path 42 along the divider 38. The common magnetic path 42 provides a high permeability close-loop route for the magnetic flux 40, amplifying the magnetic flux 40 throughout the air gaps 39 so that the magnetic flux density in the air gaps 39 is equal or greater than the residual magnetic density of the permanent magnets themselves. The dual-magnet configuration also results in the magnetic flux 40 being more evenly distributed along the air gaps 39. Placing a wire coil 50 in the air gaps 39 between the shell magnets 32a, 34b and the core magnets 32a, 32b completes the electromagnetic assembly 16. It also results in the amplified, more evenly distributed magnetic flux 40 passing across the coil 50. By securing the coil 50 to the actuating body 14 and securing the frame 36 to the support 12, moving-coil actuation having infinite positioning resolution can be achieved when a suitable current is passed through the coil 50. A linear relationship is established between the input current and output force acting on the actuating body 14. Using a dual-magnet configuration also allows a higher output force to be realized as a result of the greater magnetic flux density acting on the coil 50.

Figure 4:
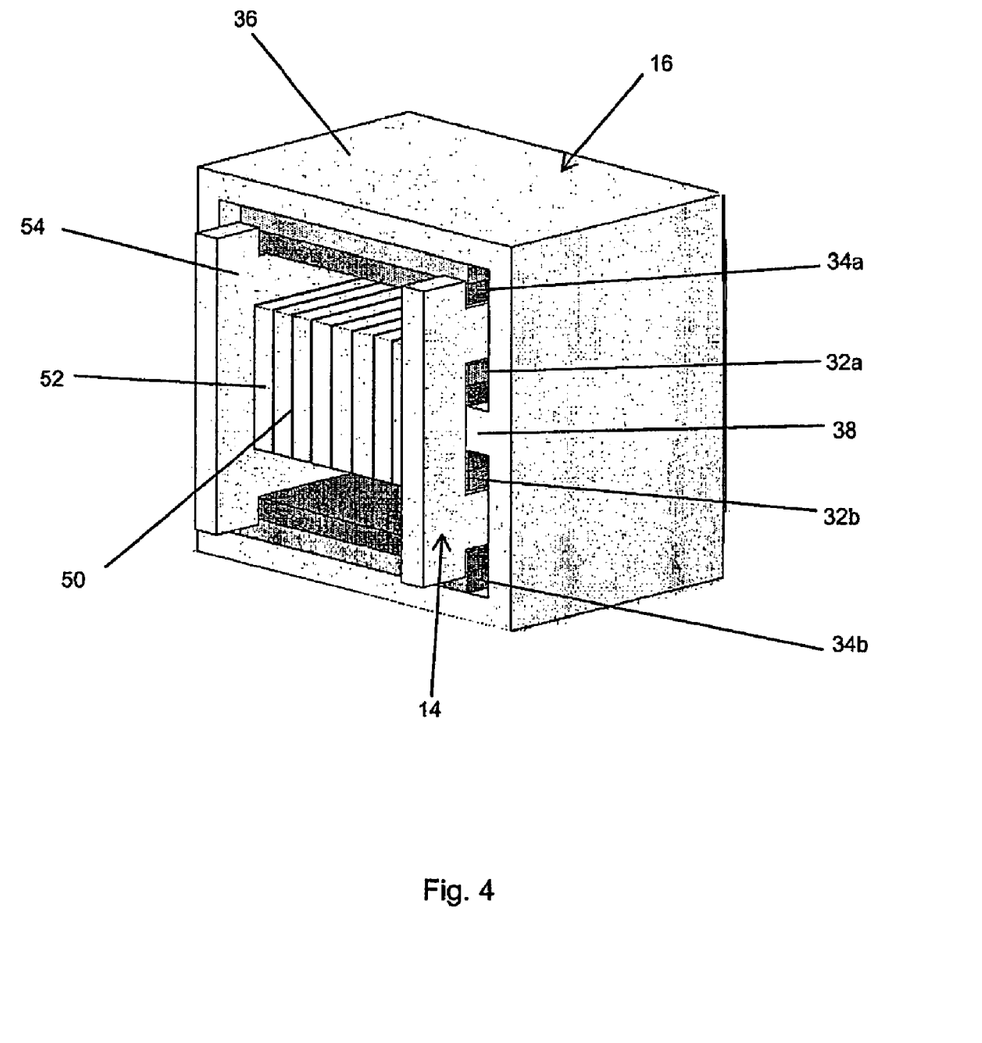
FIG. 4 is a perspective view of an actuating body of the actuator shown in FIG. 1 assembled with the electromagnetic assembly shown in FIG. 2.

FIG. 4 shows the actuating body 14 assembled with the electromagnetic assembly 16 such that the coil 50 is secured to the actuating body 14. The actuating body 14 comprises a coil holder 52 which surrounds the core magnets 32a, 32b. The coil holder 52 is essentially a rectangular tube having flanges 54 at either end. The core magnets 32a, 32b are encompassed within the coil holder 52, but not in contact with coil holder 52. The coil 50 is wound around the coil holder 52 so that the coil 50 is disposed in the air gaps 39 to allow moving-coil actuation. The flanges 54 are rigidly secured to the arms 26 of the actuating body 14 that are secured to the flexures 18.

By providing leaf springs in the form of flexures 18 together with the dual-magnet configuration of the electromagnetic assembly 16, an infinite positioning resolution and high continuous output force that is proportional to input current can thus be achieved. Unlike notch-type flexure joints, the leaf-spring joints readily allow millimeter displacement due to their low stiffness in the driven direction. They also allow smooth, rectilinear, nano-resolution movement of the actuating body 14 as they do not face mechanical limitations such as dry friction, mechanical play, backlash or wear-and-tear that are faced by conventional bearing-based guideways of existing actuators. The leaf-spring joints are also maintenance free.

Depending on the maximum operating load and displacement, properties such as yield strength, coefficient of thermal expansion and magnetic properties have to be considered when selecting a suitable material for the resilient strip 19 of the flexures 18. Theses properties will also be dependent on the actual configuration of the actuator 10. For the embodiment described, the resilient strip 19 should be made of a material having a Young's modulus of at least 190 GPa and a Poisson's ratio ranging from 0.28 to 0.32, typically being 0.3. Stainless steel is an ideal material for the resilient strip 19 of the embodiment described.

The support 12, the actuating body 14, the clamping plates 22a, 22b and the frame 36 of the electromagnetic assembly 16 should be made of non-magnetizable or non-ferrous materials so as not to interfere with the magnetic flux 40 of the magnets 32a, 32b, 34a, 34b and the coil 50. The chosen material must also provide the necessary strength and stiffness for these parts to withstand the output force and movement, while being stable at temperatures ranging from room temperature to about 150° C. Al is the preferred material for the embodiment described. Ti or carbon fiber may also be used.

Figure 5:
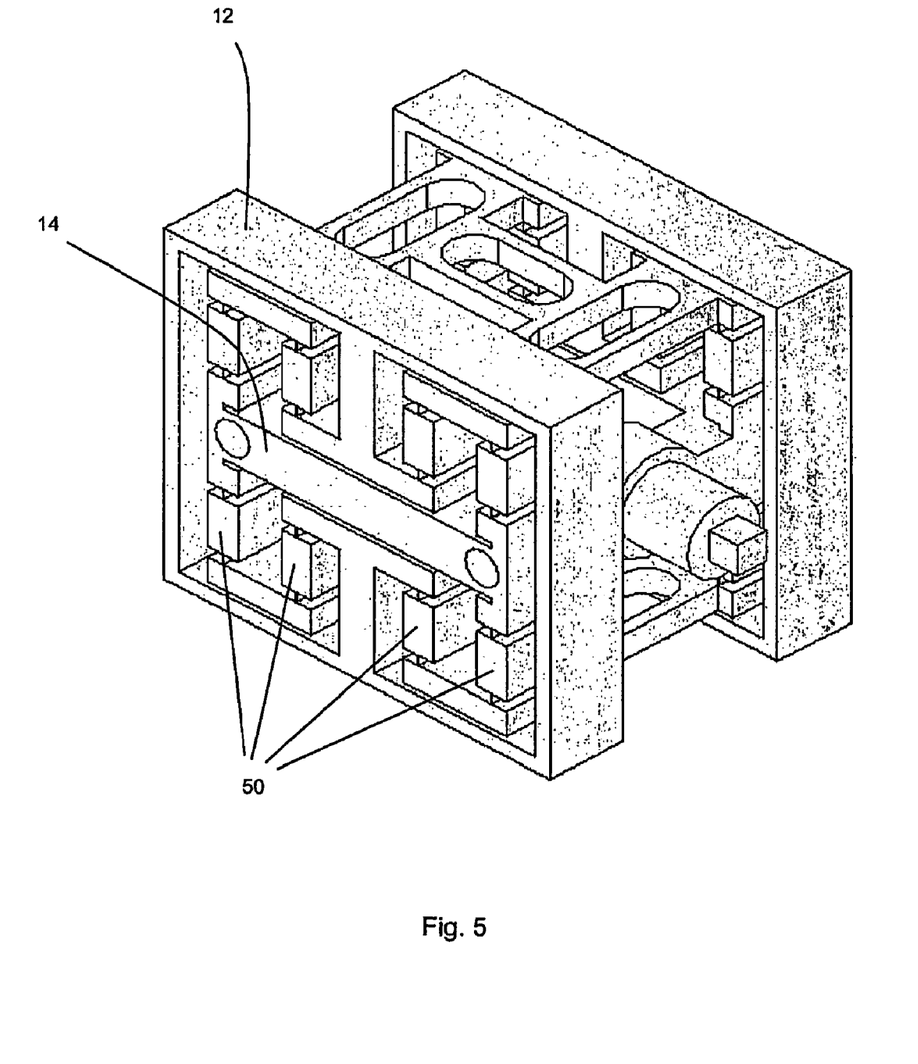
FIG. 5 is a schematic perspective view of the actuating body assembled with the support of another embodiment of the invention.
Figure 6:
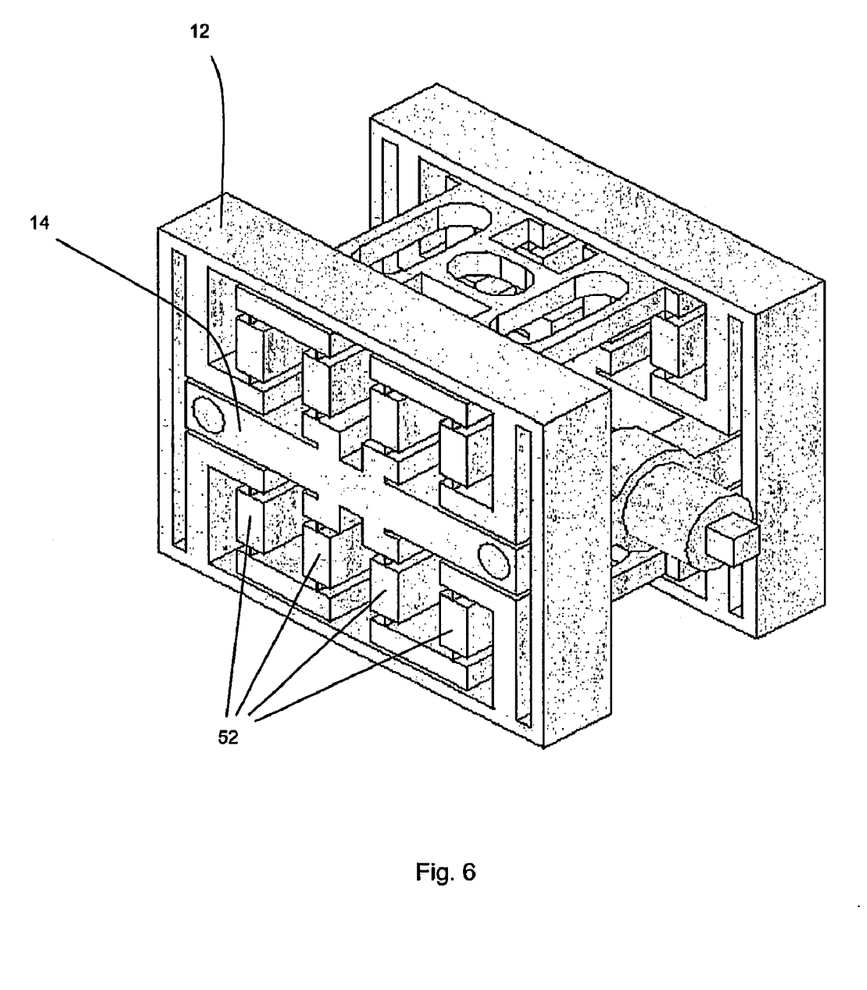
FIG. 6 is a schematic perspective view of the actuating body assembled with the support of yet another embodiment of the invention.
Figure 7:
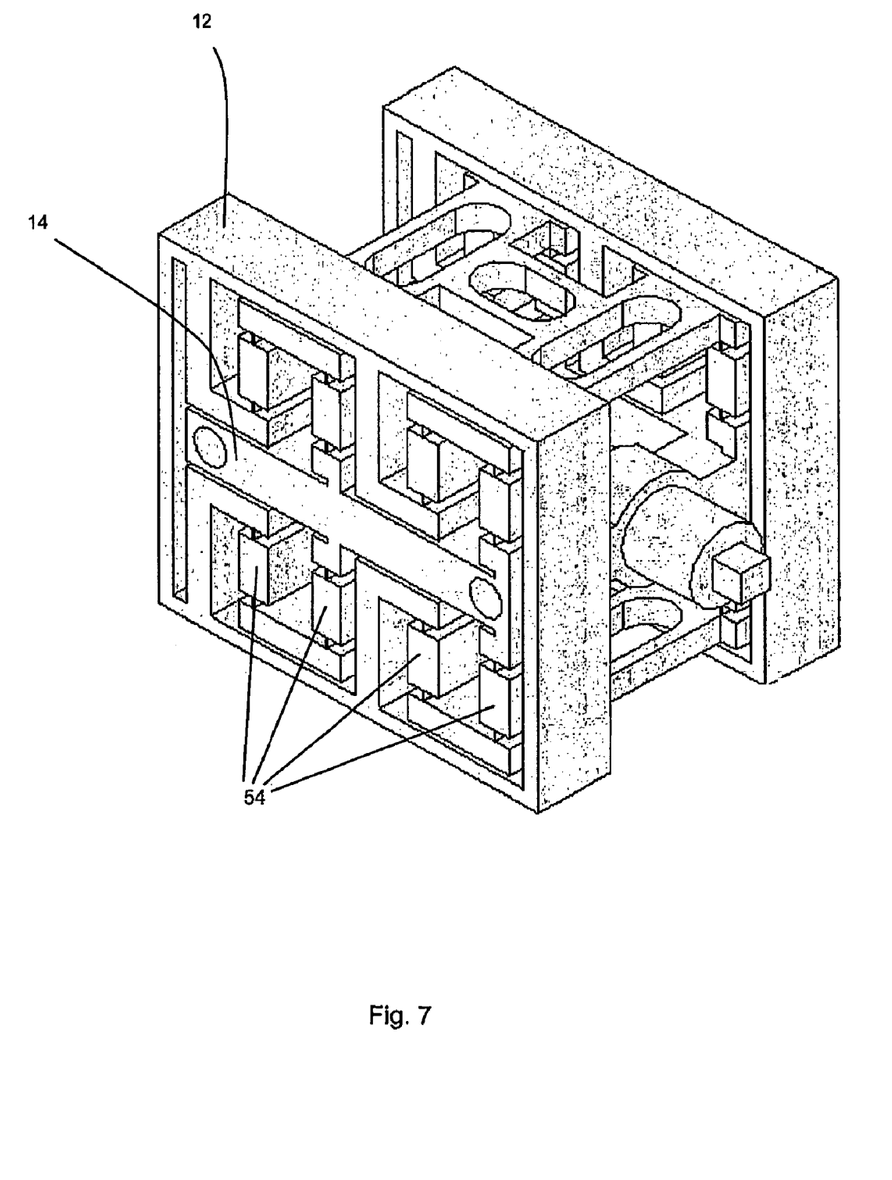
FIG. 7 is a schematic perspective view of the actuating body assembled with the support of a further embodiment of the invention.

Whilst there has been described in the foregoing description a preferred embodiment of the present invention, it will be understood by those skilled in the technology concerned that many variations or modifications in details of design or construction may be made without departing from the present invention. For example, different materials may be used for the various parts of the actuator 10, so long as they have the necessary material characteristics set out above. Also, the present invention can take on a moving-magnet configuration instead of the described moving-coil configuration. In the moving magnet configuration, the actuating body 14 and electromagnetic assembly 16 are adapted such that the actuating body can be secured to the frame 36 of the electromagnetic assembly 16. The frame 36 is adapted to be allowed to move relative to the support 12, while the coil 50 is adapted to be secured to the support 12. FIGS. 5, 6 and 7 show alternative moving-magnet embodiments of the actuator 10. The flexures 50, 52, 54 can be in various different locations as long as they allow linear movement of the frame 36 and the actuating body 14 with respect to the support 12. The support 12 and actuating body 14 can have correspondingly different designs as long as they are adapted to properly engage each other via the flexures.

The invention claimed is:

1. A flexure for an electromagnetic nano-positioning linear actuator having a support and an actuating body, the flexure comprising:
   a first resilient end for attaching to the support wherein the first resilient end bends in a driven direction of the actuating body;
   a second resilient end for attaching to the actuating body wherein the second resilient end bends in the driven direction; and
   a substantially rigid intermediate portion located between the first resilient end and the second resilient end, wherein the substantially rigid intermediate portion minimizes bending in the driven direction.

2. The flexure of claim 1, wherein the first resilient end and the second resilient end comprise a resilient strip, and the substantially rigid intermediate portion comprises two plates, a portion of the resilient strip being clamped between the two plates.

3. The flexure of claim 2, wherein the resilient strip is clamped between the two plates by means of fasteners that pass through the resilient strip and the two plates.

4. The flexure of claim 2, wherein the resilient strip is made of a material having a Young's modulus of at least 190GPa.

5. The flexure of claim 2, wherein the resilient strip is made of a material having a Poisson's ratio in the range of 0.28 to 0.32.

6. The flexure of claim 2, wherein the width of the resilient strip is at least 100 times greater than the thickness of the resilient strip.

7. An electromagnetic nano-positioning linear actuator comprising:
   a support;
   an actuating body moveable with respect to the support;
   an electromagnetic assembly connected to the actuating body and the support for moving the actuating body when a current is applied to the electromagnetic assembly; and
   at least one flexure comprising
   a first resilient end for attaching to the support wherein the first resilient end bends in a driven direction of the actuating body;
   a second resilient end for attaching to the actuating body wherein the second resilient end bends in the driven direction; and
   a substantially rigid intermediate portion located between the first resilient end and the second resilient end,
   wherein the substantially rigid intermediate portion minimizes bending in the driven direction.

8. The linear actuator of claim 7, wherein the first resilient end and the second resilient end comprise a resilient strip, and the substantially rigid intermediate portion comprises two plates, a portion of the resilient strip being clamped between the two plates.

9. The linear actuator of claim 8, wherein the resilient strip is clamped between the two plates via fasteners that pass through the resilient strip and the two plates.

10. The linear actuator of claim 8, wherein the resilient strip is made of a material having a Young's modulus of at least 190GPa.

11. The linear actuator of claim 8, wherein the resilient strip is made of a material having a Poisson's ratio in the range of 0.28 to 0.32.

12. The linear actuator of claim 8, wherein the width of the resilient strip is at least 100 times greater than the thickness of the resilient strip.

13. The linear actuator of claim 7, wherein the electromagnetic assembly comprises core magnets and shell magnets mounted on a frame, the shell magnets being disposed adjacent the core magnets to define an air gap therebetween, and a coil disposed in the air gap around the core magnets.

14. The linear actuator of claim 13, wherein the core magnets and shell magnets are rare-earth permanent magnets.

15. The linear actuator of claim 14, wherein the rare-earth permanent magnets are NdFeB magnets having a remanence magnetic flux of at least 1.0 Tesla.

16. The linear actuator of claim 13, wherein the coil is connected to the actuating body in a moving-coil configuration.

17. The linear actuator of claim 16, wherein the actuating body includes a coil holder and the coil of the electromagnetic assembly is wound around the coil holder.

18. The linear actuator of claims 13, wherein the frame is connected to the actuating body in a moving-magnet configuration.

19. An electromagnetic nano-positioning linear actuator comprising:
   a support;
   an actuating body moveable with respect to the support;
   an electromagnetic assembly connected to the actuating body and the support for moving the actuating body when a current is applied to the electromagnetic assembly, wherein the electromagnetic assembly comprises:
   a first core magnet, a second core magnet, a first shell magnet and a second shell magnet mounted in an arrangement on a frame;
   wherein in the arrangement,
   the first core magnet is in an attracting position to the second core magnet;
   the first shell magnet is in an attracting position to the first core magnet, thereby defining a first air gap between the first shell magnet and the first core magnet; and
   the second shell magnet is in an attracting position to the second core magnet thereby defining a second air gap between the second shell magnet and the second core magnet, wherein a coil is disposed in each air gap and the arrangement of the core magnets and the shell magnets generates a common magnetic path; and
   at least one flexure comprising
   a first resilient end for attaching to the support wherein the first resilient end bends in a driven direction of the actuating body;
   a second resilient end for attaching to the actuating body wherein the second resilient end bends in a driven direction of the actuating body; and
   a substantially rigid intermediate portion located between the first resilient end and the second resilient end, wherein the substantially rigid intermediate portion minimizes bending in the driven direction.

* * * * *